US007089235B2

(12) United States Patent
Dettinger et al.

(10) Patent No.: US 7,089,235 B2
(45) Date of Patent: Aug. 8, 2006

(54) METHOD FOR RESTRICTING QUERYABLE DATA IN AN ABSTRACT DATABASE

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 10/418,592

(22) Filed: Apr. 17, 2003

(65) Prior Publication Data
US 2004/0210579 A1 Oct. 21, 2004

(51) Int. Cl.
*G06F 17/30* (2006.01)

(52) U.S. Cl. .................. 707/4; 707/2; 707/3; 707/100; 707/101

(58) Field of Classification Search .............. 707/1–4, 707/9, 100, 101
See application file for complete search history.

(56) References Cited

U.S. PATENT DOCUMENTS 5,870,746 A * 2/1999 Knutson et al. ............ 707/101
6,134,549 A * 10/2000 Regnier et al. ............... 707/9
6,694,306 B1 * 2/2004 Nishizawa et al. ........... 707/3
6,725,227 B1   4/2004 Li
2003/0154191 A1 * 8/2003 Fish et al. .................... 707/2

* cited by examiner

*Primary Examiner*—Khanh B. Pham
(74) *Attorney, Agent, or Firm*—Patterson & Sheridan, LLP; William J. McGinnis, Jr.

(57) ABSTRACT

A method, system and article of manufacture for processing queries that are executed against a database and, more particularly, for restricting queryable data in a database to a subset of all available data in the database when a query is executed against the database is provided. One embodiment provides a logical representation of all of the available data in underlying physical entities by defining a plurality of logical fields abstractly describing data stored by the associated physical entities, receiving an abstract query comprising at least one logical field of the plurality of logical fields, retrieving at least one condition defining at least one property common to a plurality of physical entities of the queryable data, associating the at least one condition with the abstract query and, in accordance with the at least one condition, restricting the queryable data to the subset of all the available data when executing the abstract query.

42 Claims, 13 Drawing Sheets

METHOD FOR RESTRICTING QUERYABLE DATA IN AN ABSTRACT DATABASE

BACKGROUND OF THE INVENTION

1. Field of the Invention

The present invention generally relates to data processing in databases and more particularly to processing queries that are executed against a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art is the manner in which information can be presented to the user. A number of software solutions support the use of user-defined queries, in which the user is provided with a tool to construct a query that meets the user's specific data selection requirements. In an SQL-based system, the user is given a list of underlying database tables and columns to choose from when building a query. The user must decide which tables and columns to access based on the naming convention used by the database administrator. This approach does not provide an effective way to subset the set of information presented to the user and, thus, complicates the building of queries as even nonessential content is revealed to the user.

Assuming a solution to the foregoing difficulties, another issue which must be addressed is analysis of query results. In general, analysis is an iterative process that implies doing work on results of one or more previous steps. In a database environment, the one or more previous steps are usually queries which returned results from an underlying database. In many conventional systems each query is executed separately against the database so that a distinct query result for each executed query is presented to the user. If the user is interested in analyzing query results of previously executed queries by issuing additional queries, the user is generally required to manually combine the additional queries with the previously executed ones and to execute the combined queries to obtain a new query result. Consequently, it may be desirable to limit the accessible data in the database to a subset of the data to narrow or focus research and analysis on the subset of the data for certain fields, so that subsequent queries may be issued against the database without the need for manually combining queries. For instance, it may be desirable to restrict a patient warehouse in a medical database environment to cardiac patients for the purpose of studying effectiveness of treatments and medication without requiring the user to manually limit the search to cardiac patients by inputting a corresponding condition into each query issued against the medical database.

Therefore, there is a need for an improved and more flexible technique for handling related queries in a database environment, which are subsequently issued by a requesting entity against the database.

SUMMARY OF THE INVENTION

The present invention generally is directed to a method, system and article of manufacture for processing queries that are executed against a database and, more particularly, for restricting queryable data in a database to a subset of all available data in the database when a query is executed against the database.

One embodiment for restricting queryable data in a database to a subset of all available data in the database when a query is executed against the database comprises providing a logical representation of all the available data defining a plurality of logical fields abstractly describing associated physical entities of all the available data, receiving an abstract query comprising at least one logical field of the plurality of logical fields, retrieving at least one condition defining at least one property common to a plurality of physical entities of the queryable data, associating the at least one condition with the abstract query and, in accordance with the at least one condition, restricting the queryable data to the subset of all the available data when executing the abstract query.

Another embodiment comprises receiving a query against all the available data, retrieving at least one condition defining at least one property common to a plurality of physical entities of the queryable data, associating the at least one condition with the query and, in accordance with the at least one condition, restricting the queryable data to the subset of all the available data when executing the query.

Still another embodiment comprises providing a logical representation of all the available data defining a plurality of logical fields abstractly describing associated physical entities of all the available data, retrieving at least one condition defining at least one property common to a plurality of physical entities of the queryable data, restricting the queryable data to the subset of all the available data using the at least one condition, receiving an abstract query comprising at least one logical field of the plurality of logical fields and executing the abstract query against the queryable data.

Still another embodiment comprises retrieving at least one condition defining at least one property common to a plurality of physical entities of the queryable data, restricting the queryable data to the subset of all the available data using the at least one condition, receiving a query against all the available data and executing the query against the queryable data.

Still another embodiment provides a method for restricting queryable data in a database having a plurality of tables to a subset of all available data in the database when a query is executed against the database. The method comprises receiving a query against all the available data; determining whether the query joins two or more tables in the database; and, if the query joins two or more tables, retrieving at least one condition defining at least one property common to a plurality of physical entities of the queryable data, the at least one condition being associated with at least one previous query; associating the at least one condition with the query; and, in accordance with the at least one condition, restricting the queryable data to the subset of all the available data when executing the query.

Still another embodiment provides a method for restricting queryable data in a database to a subset of all available data in the database. The method comprises providing a first logical representation of all the available data defining a plurality of logical fields abstractly describing associated physical entities of all the available data, retrieving at least one condition defining at least one property common to a plurality of physical entities of the queryable data and modifying at least a portion of the logical fields to abstractly describe the plurality of physical entities of the queryable data for providing, using the at least one condition, a second logical representation of the queryable data from the first logical representation.

Still another embodiment provides a computer-readable medium containing a program which, when executed by a processor, performs an operation for restricting queryable data in a database to a subset of all available data in the database when a query is executed against the database. The operation comprises, in response to receiving an abstract query comprising at least one logical field of a plurality of logical fields defined in a logical representation of all the available data defining the plurality of logical fields which abstractly describe associated physical entities of all the available data, retrieving at least one condition defining at least one property common to a plurality of physical entities of the queryable data, associating the at least one condition with the abstract query and, in accordance with the at least one condition, for restricting the queryable data to the subset of all the available data when executing the abstract query.

Still another embodiment provides a computer-readable medium containing a program which, when executed by a processor, performs an operation for restricting queryable data in a database to a subset of all available data in the database for executing a query against the database. The operation comprises, in response to receiving an abstract query comprising at least one logical field of a plurality of logical fields defined in a logical representation of all the available data defining the plurality of logical fields which abstractly describe associated physical entities of all the available data, retrieving at least one condition defining at least one property common to a plurality of physical entities of the queryable data, restricting the queryable data to the subset of all the available data using the at least one condition, receiving an abstract query comprising at least one logical field of the plurality of logical fields and executing the abstract query against the queryable data.

Still another embodiment provides a computer-readable medium containing a program which, when executed by a processor, performs an operation for restricting queryable data in a database to a subset of all available data in the database. The operation comprises, in response to user input, generating a first logical representation of all the available data defining a plurality of logical fields abstractly describing associated physical entities of all the available data, retrieving at least one condition defining at least one property common to a plurality of physical entities of the queryable data, and modifying at least a portion of the logical fields to abstractly describe the plurality of physical entities of the queryable data for generating, using the at least one condition, a second logical representation of the queryable data from the first logical representation.

Yet another embodiment provides a computer, comprising a database containing available data, a data abstraction model defining a plurality of logical fields abstractly describing associated physical entities of all the available data, a query building application for building abstract queries according to the data abstraction model, a runtime component configured to transform the abstract queries into concrete queries having a form consistent with the data, and a rule application manager configured to associate at least one condition defining at least one property common to at least a portion of the associated physical entities of all the available data with a given abstract query for restricting queryable data in the database to a subset of all the available data using the at least one condition when a concrete query, corresponding to the given abstract query after being transformed, is executed against the database.

Yet another embodiment provides a computer, comprising a database containing available data, a data abstraction model defining a plurality of logical fields abstractly describing associated physical entities of all the available data, a query building application for building abstract queries according to the data abstraction model, a runtime component configured to transform the abstract queries into concrete queries having a form consistent with the data, and a rule application manager for restricting queryable data in the database to a subset of all the available data using at least one condition defining at least one property common to a plurality of physical entities of the queryable data when a concrete query, corresponding to an abstract query after being transformed, is executed against the database.

Yet another embodiment provides a computer, comprising a database containing available data, a first data abstraction model defining a plurality of logical fields abstractly describing associated physical entities of all the available data, and a rule application component for generating a second data abstraction model from the first data abstraction model, for restricting queryable data in the database to a subset of all the available data using at least one condition defining at least one property of a plurality of physical entities of the queryable data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
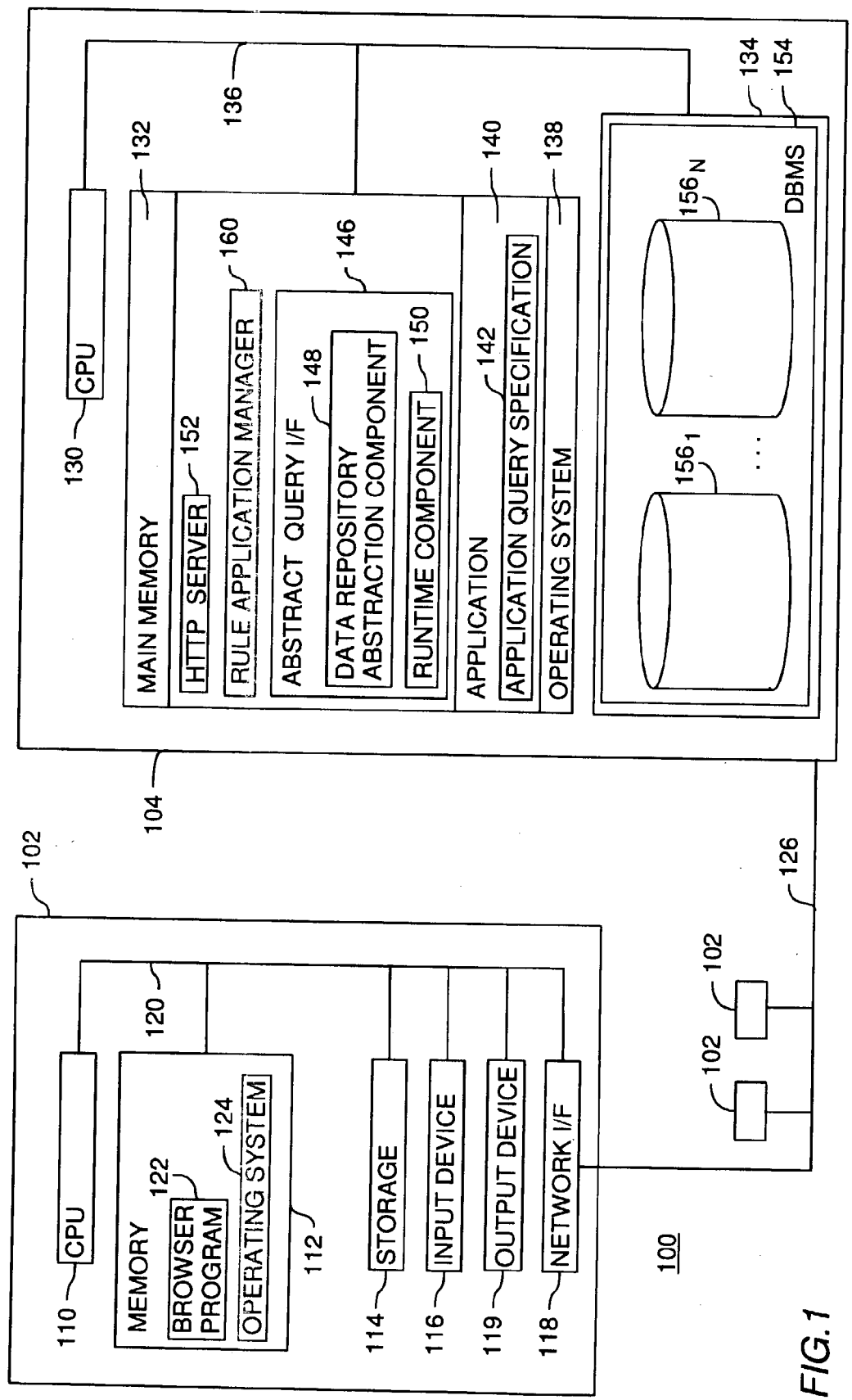
FIG. 1 is one embodiment of a computer system utilized in accordance with the invention.

The present invention is generally directed to a system, method and article of manufacture for processing queries that are executed against a database and, more particularly, for restricting queryable data in a database to a subset of all available data in the database when a query is executed against the database. In one embodiment, a data repository abstraction layer provides a logical view of the underlying database that is independent of the particular manner in which the data is physically represented. The data repository abstraction layer represents a data abstraction model that defines a plurality of logical fields abstractly defining the data. A query abstraction layer is also provided and is based on the data repository abstraction layer. The query abstraction layer includes a query building application for building abstract queries according to the data abstraction model. The query building application is implemented as a data query builder provided, e.g., as a single application that accesses the data repository abstraction as if it were a physical database. A runtime component representing a data query abstraction component performs translation of abstract queries into concrete queries having a form consistent with the data. A concrete query can be used against a particular physical data representation. The data query abstraction component services logical data access requests of the data query builder, without giving the data query builder the knowledge that the physical data representation exists, nor about the physical queries, i.e., the concrete queries resulting from the abstract queries. A rule application management component implements a rule application mechanism for restricting the queryable data in the database to the subset of all the available data in the database when a query is executed against the database.

In one embodiment, the data repository abstraction layer includes multiple data repository abstraction components/instances which coexist (and, in some embodiments, cooperate) within a single application space. The provision of multiple data abstraction components/instances of data repository abstractions allows different sets of data to be exposed to different users.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104 is shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140, an abstract query interface 146 and a rule application manager 160. The applications 140, the abstract query interface 146 and the rule application manager 160 are software products having a plurality of instructions that are resident at various times in various memory and storage devices in the computer system 100. When read and executed by one or more processors 130 in the server 104, the applications 140, the abstract query interface 146 and the rule application manager 160 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) 154 in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154, e.g., by translating abstract queries into concrete queries. The rule application manager 160 implements a rule application mechanism for restricting queryable data to a subset of all available data contained in the DBMS 154. In one embodiment, the rule application manager 160 restricts the queryable data by redefining a query that is executed against the database in order to execute the redefined query against the queryable data. Alternatively, the rule application manager 160 restricts the queryable data using a condition retrieved from storage when executing a received query. Still alternatively, the rule application manager 160 restricts the queryable data by modifying the data repository abstraction component. The application query specification 142, the abstract query interface 146 and the rule application manager 160 are further described with reference to FIGS. 2A–B and FIG. 7.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (HTTP) server process 152 (e.g., a web server) adapted to service requests from the client computer 102. For example, the process 152 may respond to requests to access a database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative and other embodiments adapted to support any known and unknown protocols are contemplated.

Logical/Runtime View of Environment

Figure 2A:
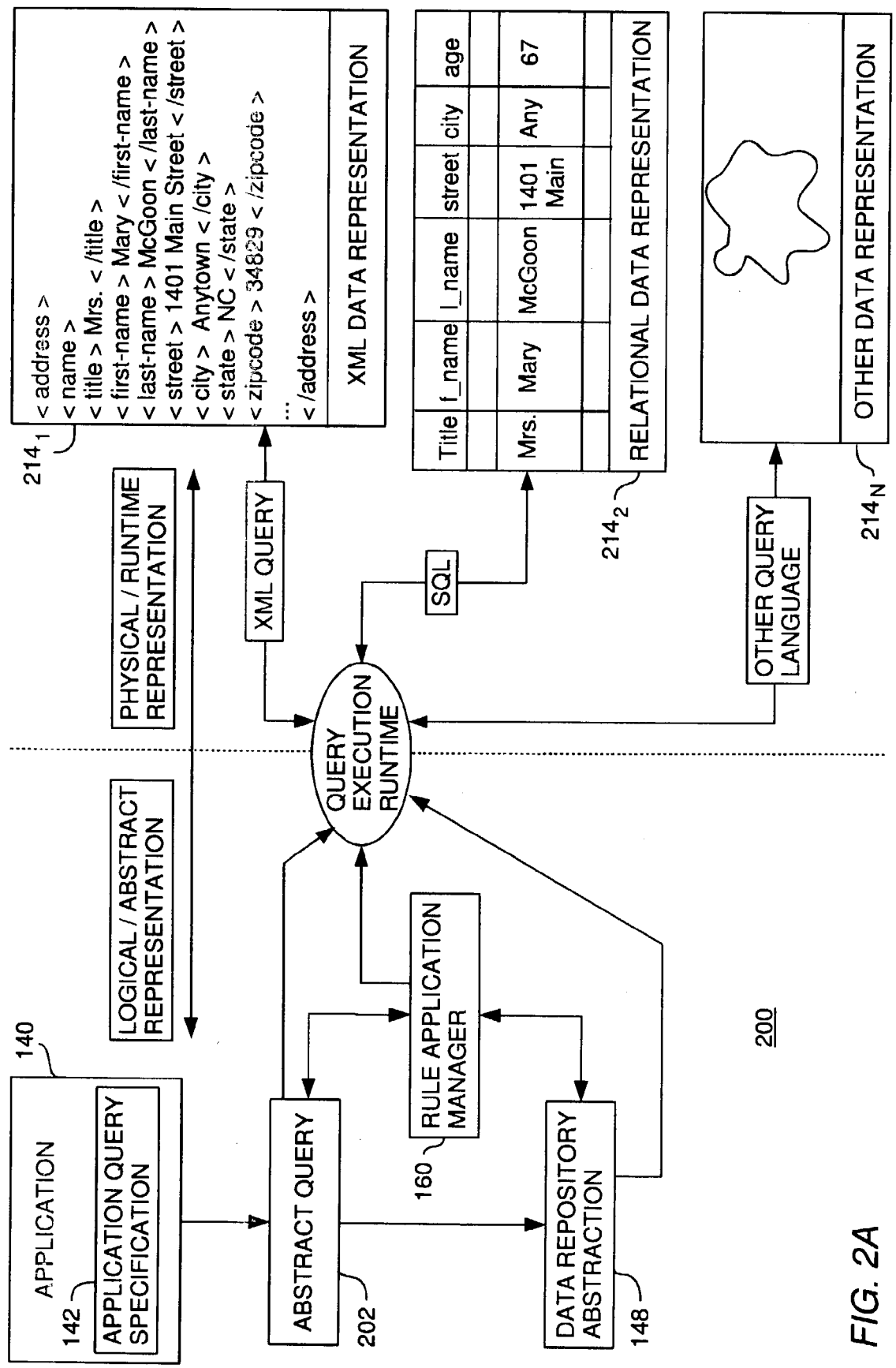
FIGS. 2A–B are relational views of software components of one embodiment of the invention.
Figure 2B:
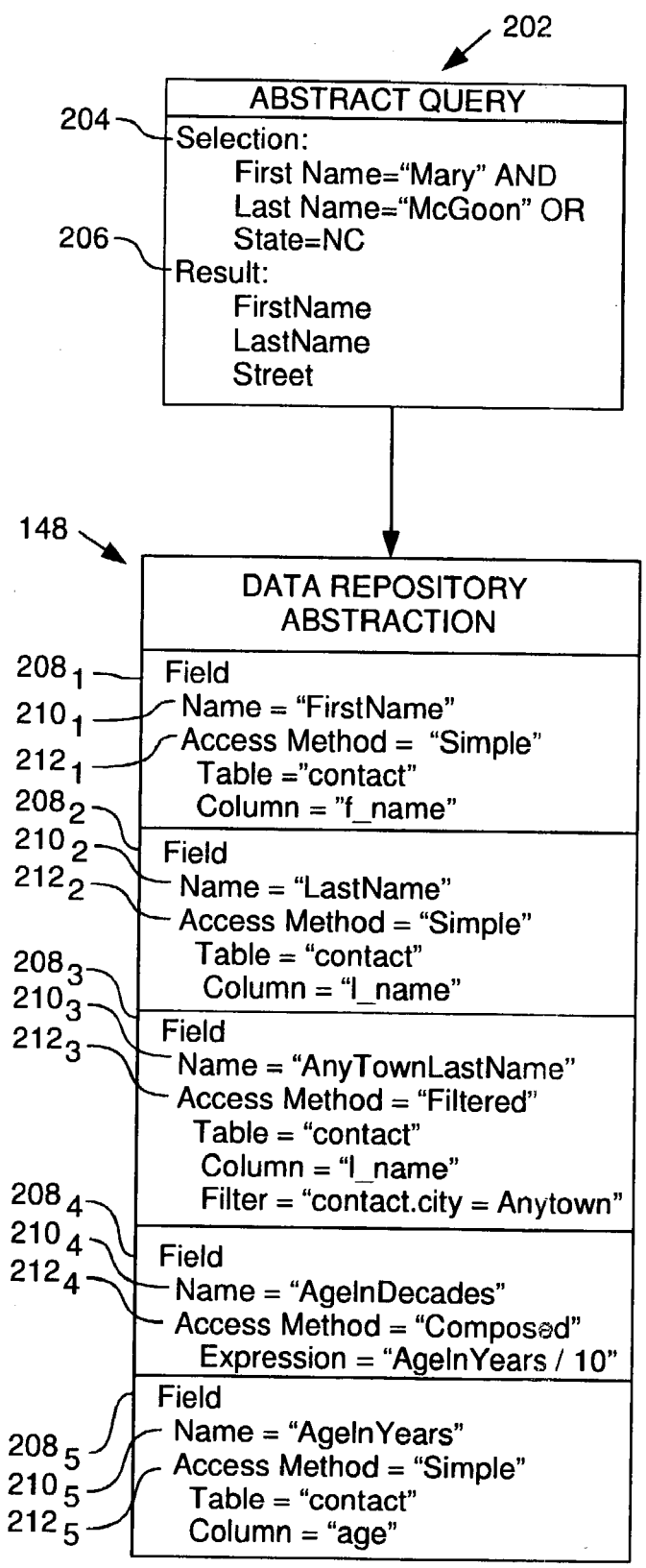

FIGS. 2A–B show an illustrative relational view 200 of components of the invention. A requesting entity (e.g., one of the applications 140 of FIG. 1) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the database 156, thereby allowing queries to be formed that are loosely coupled to the underlying data representation.

In one embodiment, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification contains a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in the database (e.g., database 156). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 148 contains field specifications (with associated access methods) for two or more physical data representations 214. In an alternative embodiment, a different single data repository abstraction component 148 is provided for each separate physical data representation 214.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide filters used to define a particular subset of items within the physical data representation. An example is provided in FIG. 2B in which the filtered field access method $212_3$ maps the logical field name $210_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_4$ maps the logical field name $210_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

An illustrative abstract query corresponding to the abstract query 202 shown in FIG. 2B is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value="Mary" |
| 008 | internalID="1"/> |
| 009 |       <Condition field="LastName" operator="EQ" value="McGoon" |
| 010 | internalID="3" relOperator="AND"></Condition> |
| 011 |     </Condition> |
| 012 |     <Condition field="State" operator="EQ" value="NC" internalID="2" |
| 013 | relOperator="OR"></Condition> |
| 014 |   </Selection> |
| 015 |   <Results> |
| 016 |     <Field name="FirstName"/> |
| 017 |     <Field name="LastName"/> |
| 018 |     <Field name="Street"/> |
| 019 |   </Results> |
| 020 | </QueryAbstraction> |

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative Data Repository Abstraction is shown in Table II below. By way of illustration, the illustrative Data Repository Abstraction is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="State" displayable="Yes"> |
| 017 |       <AccessMethod> |
| 018 |         <Simple columnName="state" tableName="contact"></Simple> |
| 019 |       </AccessMethod> |
| 020 |       <Type baseType="char"></Type> |
| 021 |     </Field> |
| 022 |   </Category> |
| 023 | </DataRepository> |

Figure 3A:
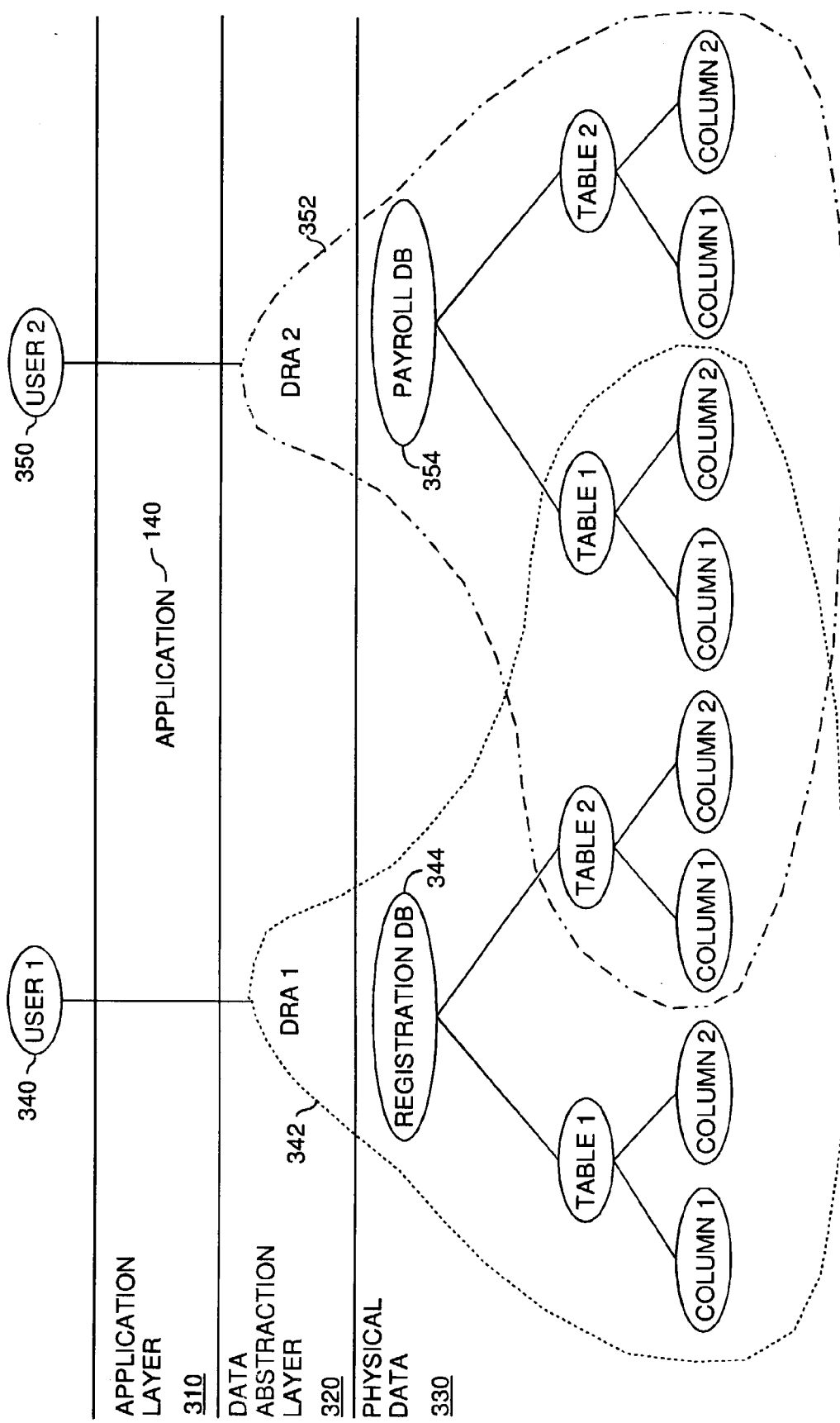
FIG. 3A illustrates one embodiment in which multiple data repository abstraction components coexist in a single application space.

As noted above, one embodiment provides multiple data repository abstraction components which coexist in a single application space. One embodiment illustrating such an environment is shown in FIG. 3A. The environment shown in FIG. 3A generally comprises an application layer 310 (defined by the application 140), a data abstraction layer 320, and a physical data layer 330. The environment shows two users 340, 350 accessing the physical data layer 330 via the application layer 320 using, e.g., application 140 of FIG. 1 (e.g., by issuing abstract query 202 of FIG. 2). Accordingly, the application layer 320 may comprise a data query builder component adapted to enable the users to build abstract queries.

The users 340, 350 are accessing the same physical data layer 330 through a common application layer 320. However, the data being exposed to the respective users 340, 350 is not the same. Rather, each user is exposed to selected portions of the physical data layer 330 according to the definition of the data abstraction layer 320. More particularly, the data abstraction layer 320 illustratively includes two data repository abstraction components, DRA1 342 and DRA2 352, which define the data that will be exposed to the users 340, 350, respectively, via the application layer 310. The data abstraction layer 320 may comprise a data query abstraction component which services logical data access of the data query builder component to the physical data in physical data layer 330.

In the present example, the first data repository abstraction 342 (DRA1) exposes all of a first database 344 (registration database) and TABLE 1 of a second database 354 (payroll database), while the second data repository abstraction 352 (DRA2) exposes the entire second database 354 and TABLE 2 of the first database 344. It should be noted that the particular data exposed by the respective data repository abstraction components is merely illustrative. More generally, any portion of the databases 344, 354 may be exposed, as well as any other databases of the physical data layer 330. By way of illustration, the environment of FIG. 3A shows two users (340, 350). However, more generally any number of users may be accessing the data of the physical data layer 330.

Figure 3B:
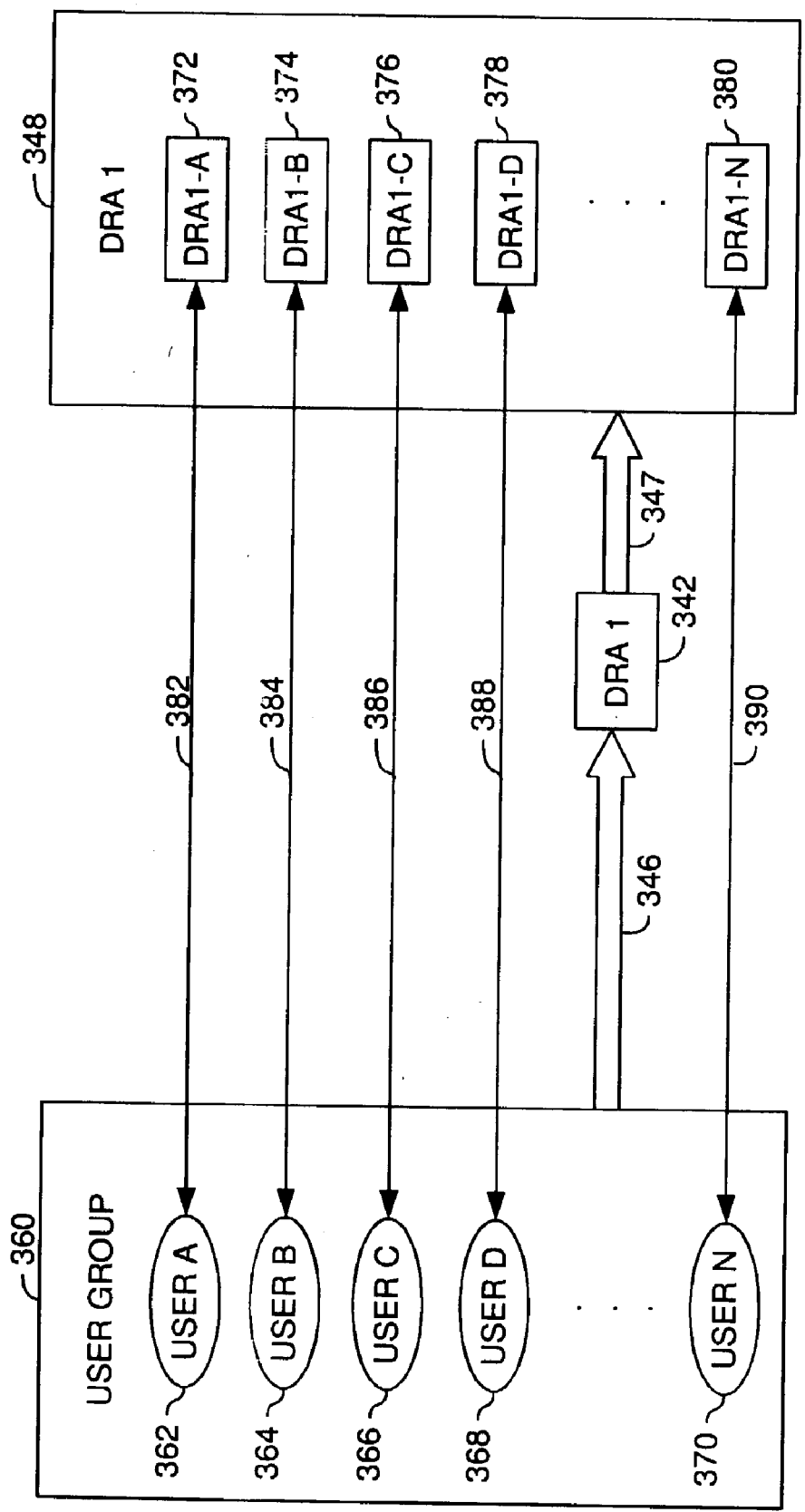
FIG. 3B illustrates one embodiment in which multiple instances of a single data repository abstraction component coexist in a single application space.

Referring now to FIG. 3B, an embodiment in which multiple instances of a single data repository abstraction component (e.g. data repository abstraction component 148) coexist in a single application space is illustrated. According to FIG. 3B, a group 360 of users 362 (USER A), 364 (USER B), 366 (USER C), 368 (USER D), . . . , 370 (USER N) accesses (as illustrated by arrow 346) a single data repository abstraction 342, independent of whether only one or a plurality of data repository abstractions exist. In the present illustration, all users of the group 360 of users access data repository abstraction DRA1.

For each user 362, 364, 366, 368, . . . , 370 accessing the data repository abstraction 342 (DRA1), an instance of the data repository abstraction 342 is generated (as indicated by arrow 347), thereby generating a group 348 of data repository abstraction instances. Accordingly, instances 372 (DRA1-A), 374 (DRA1-B), 376 (DRA1-C), 378 (DRA1-D), . . . , 380 (DRA1-N) are generated for the users 362, 364, 366, 368, . . . , 370, respectively, as indicated by arrows 382, 384, 386, 388 and 390. Providing an instance of the data repository abstraction 342 for each user allows adapting a corresponding instance to the needs and specific requirements of the user without globally changing the data repository abstraction 342 for all users in the group 360.

Figure 4:
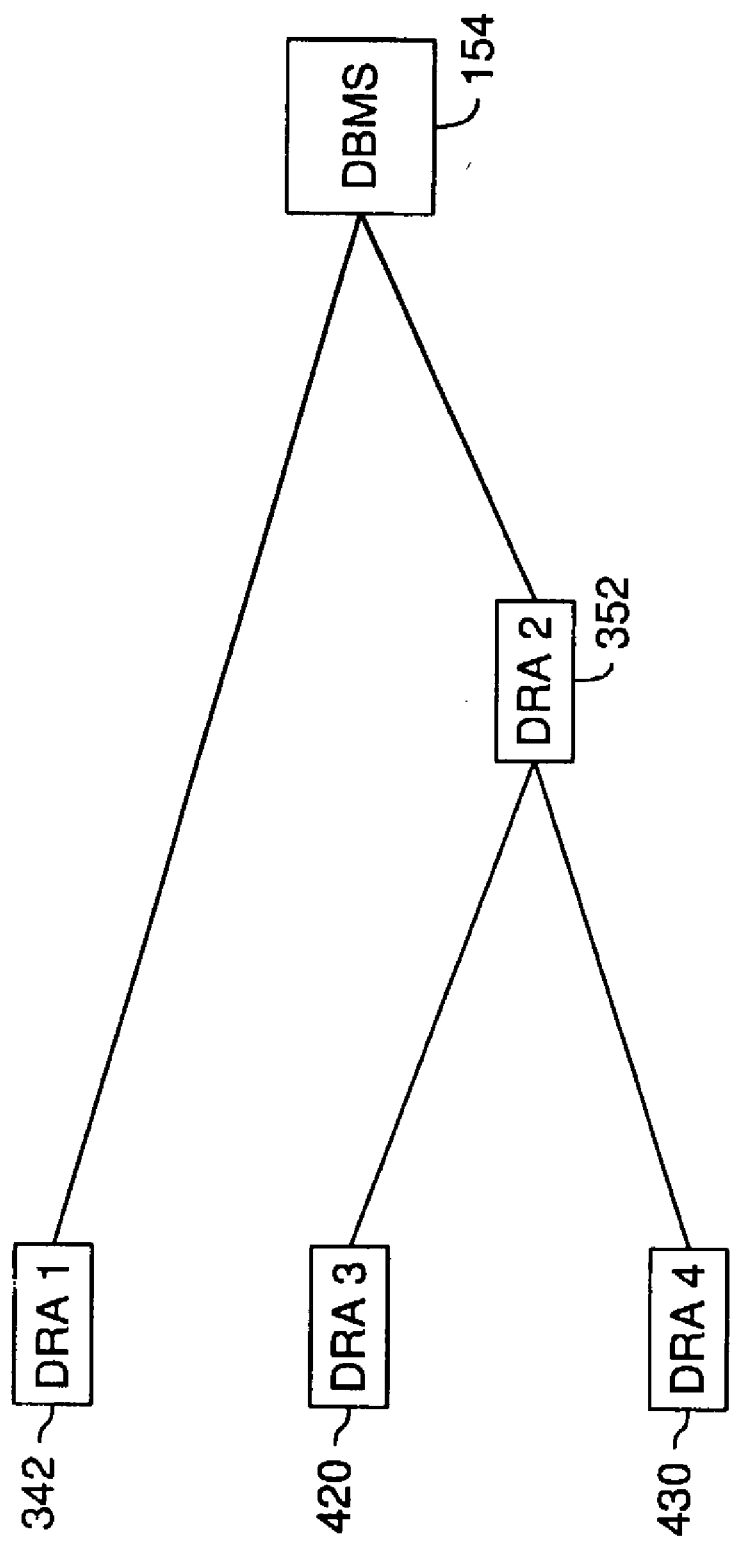
FIG. 4 illustrates an environment with plural data repository abstraction components.

FIG. 4 illustrates an embodiment in which a plurality of data repository abstraction components reference one another. Specifically, the second data repository abstraction component DRA2 352 of FIG. 3A is illustrated as a parent with respect to a third data repository abstraction component DRA3 420 (a child) and a fourth data repository abstraction component DRA4 430. In this relationship, the third and/or fourth data repository abstraction components DRA3 420, DRA4 430 may inherit a portion of the definition of the second data repository abstraction component DRA2 352. In more detail, a portion of the logical fields provided in the second data repository abstraction component DRA2 352, which is not comprised in the third and/or fourth data repository abstraction components DRA3 420, DRA4 430, may be included therein by inheritance. Alternatively, the third and/or fourth data repository abstraction component DRA3 420, DRA4 430 may override portions of the second data repository abstraction component DRA2 352 and/or include additional definitions, e.g., logical fields not found in the second data repository extraction component DRA2 352. Still alternatively, the second data repository abstraction component DRA2 352 may be constructed by a combination of the definitions and/or logical fields comprised in the third and fourth data repository abstraction components DRA3 420, DRA4 430.

Figure 5:
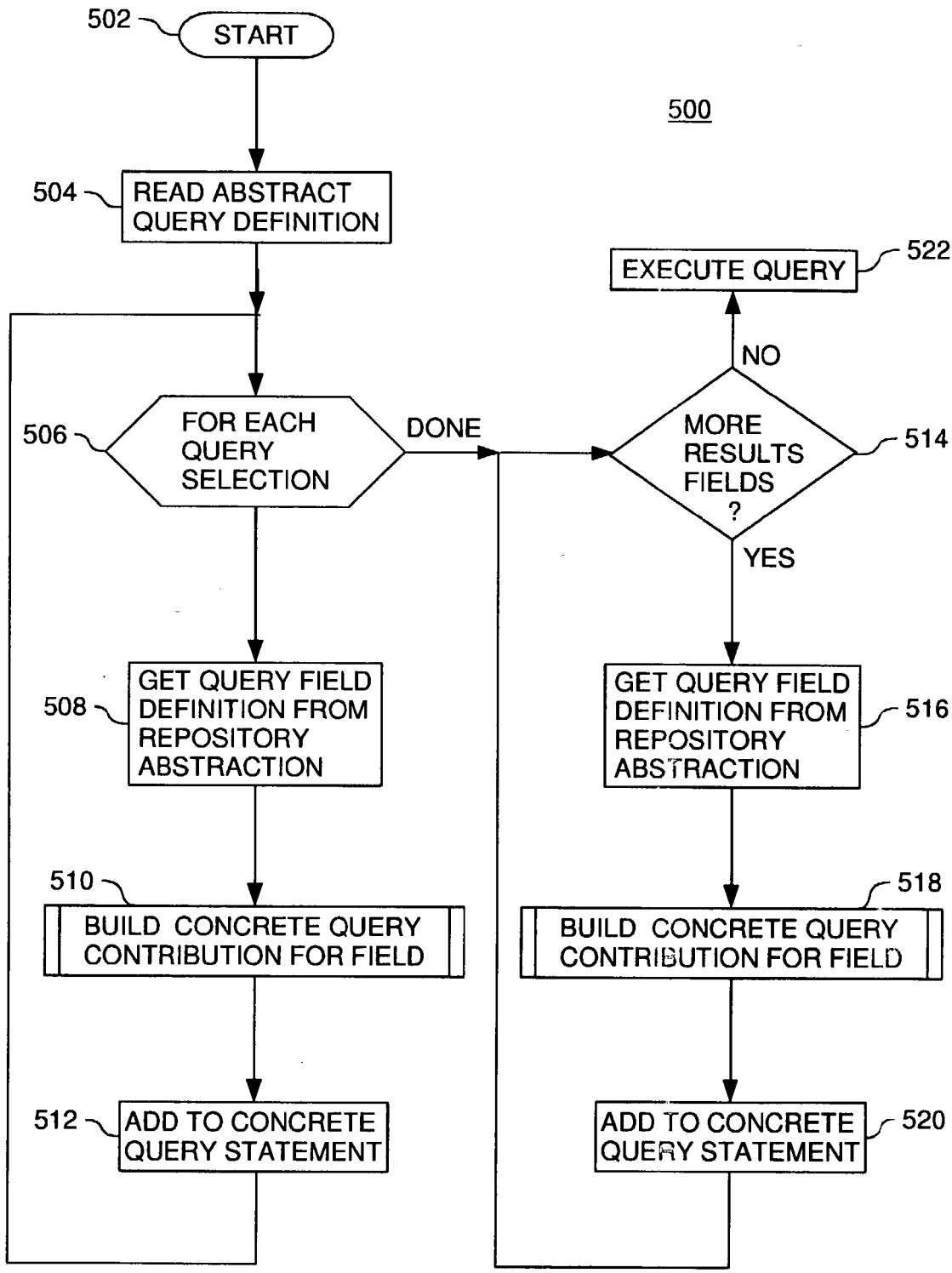
FIG. 5 is a flow chart illustrating the operation of a runtime component.

FIG. 5 shows an illustrative runtime method 500 exemplifying one embodiment of the operation of the runtime component 150 of FIG. 1. The method 500 is entered at step 502 when the runtime component 150 receives as input an instance of an abstract query (such as the abstract query 202 shown in FIG. 2). In step 504, the runtime component 150 reads and parses the instance of the abstract query and locates individual selection criteria and desired result fields. At step 506, the runtime component 150 enters a loop (comprising steps 506, 508, 510 and 512) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). In step 508, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 510) a Concrete Query Contribution for the logical field being processed. As defined herein, a Concrete Query Contribution is a portion of a concrete query that is used to perform data selection based on the current logical field. A concrete query is a query represented in languages like SQL and XML and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 500 then returns to step 506 to begin processing for the next field of the abstract query. Accordingly, the process entered at step 506 is iterated for each data selection field in the abstract query, thereby contributing additional content to the eventual query to be performed.

As described above, in one embodiment, the abstract query defines a list of abstract fields that are to be returned as a result of query execution, referred to herein as a result specification. A result specification in the abstract query may consist of a field name and sort criteria.

Accordingly, the method 500 enters a loop at step 514 (defined by steps 514, 516, 518 and 520) to add result field definitions to the concrete query being generated. In step 516, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 518) a Concrete Query Contribution (of the concrete query that identifies physical location of data to be returned) for the logical result field. In step 520, Concrete Query Contribution is then added to the Concrete Query Statement. Once each of the result specifications in the abstract query has been processed, the query is executed at step 522.

Figure 6:
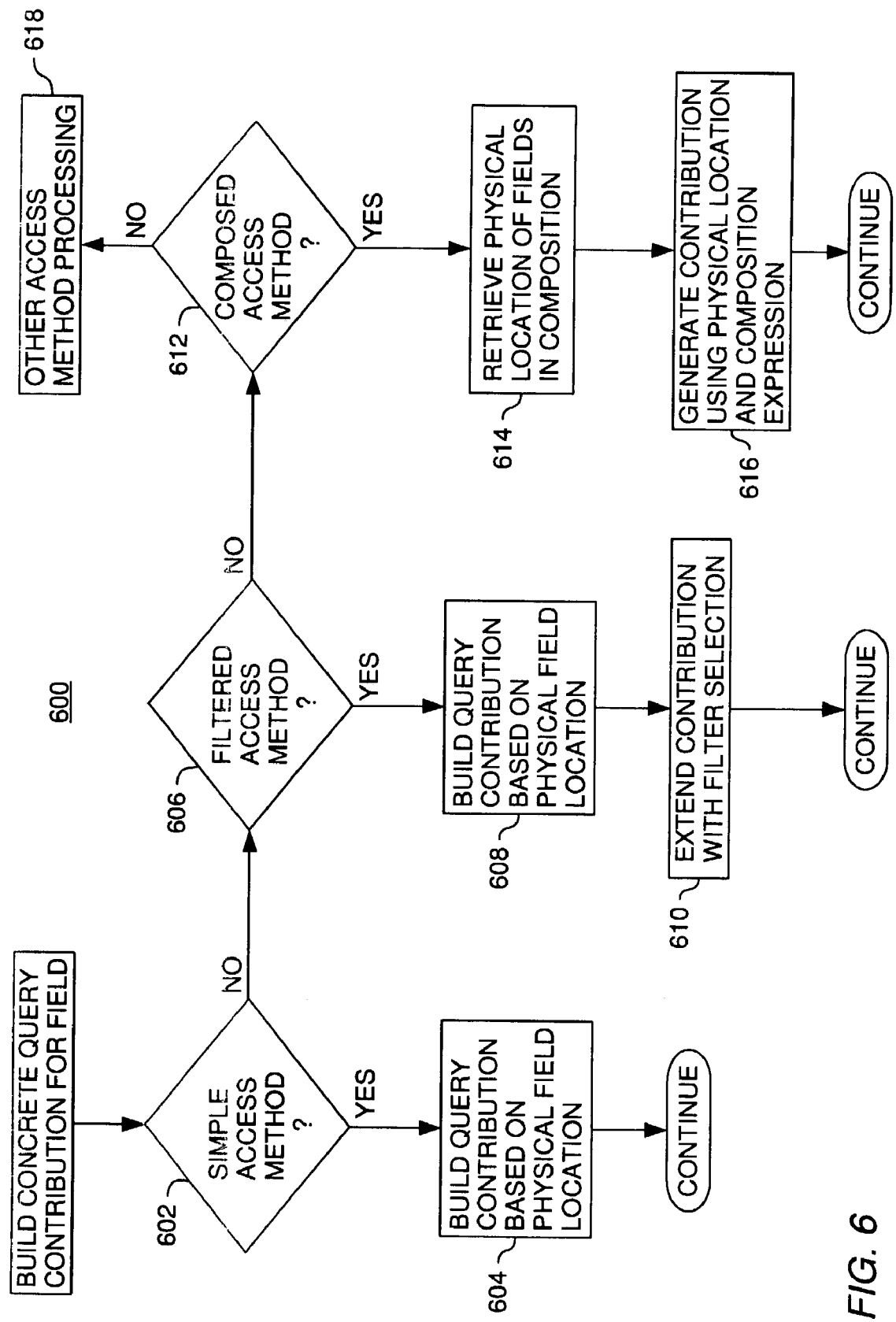
FIG. 6 is a flow chart illustrating the operation of a runtime component.

One embodiment of a method 600 for building a Concrete Query Contribution for a logical field according to steps 510 and 518 is described with reference to FIG. 6. In step 602, the method 600 queries whether the access method associated with the current logical field is a simple access method. If so, the Concrete Query Contribution is built (step 604) based on physical data location information and processing then continues according to method 500 described above.

Otherwise, processing continues to step 606 to query, whether the access method associated with the current logical field is a filtered access method. If so, the Concrete Query Contribution is built (step 608) based on physical data location information for some physical data entity. In step 610, the Concrete Query Contribution is extended with additional logic (filter selection) used to subset data associated with the physical data entity. Processing then continues according to method 500 described above.

If the access method is not a filtered access method, processing proceeds from step 606 to step 612 where the method 600 queries whether the access method is a composed access method. If the access method is a composed access method, the physical data location for each sub-field reference in the composed field expression is located and retrieved in step 614. In step 616, the physical field location information of the composed field expression is substituted for the logical field references of the composed field expression, whereby the Concrete Query Contribution is generated. Processing then continues according to method 500 described above.

If the access method is not a composed access method, processing proceeds from step 612 to step 618. Step 618 is representative of any other access methods types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 600. For example, the conversion may be performed as part of, or immediately following, the steps 604, 608 and 616. A subsequent conversion from the format of the physical data to the format of the logical field is performed after the query is executed at step 522. Of course, if the format of the logical field definition is the same as the underlying physical data, no conversion is necessary.

Figure 7:
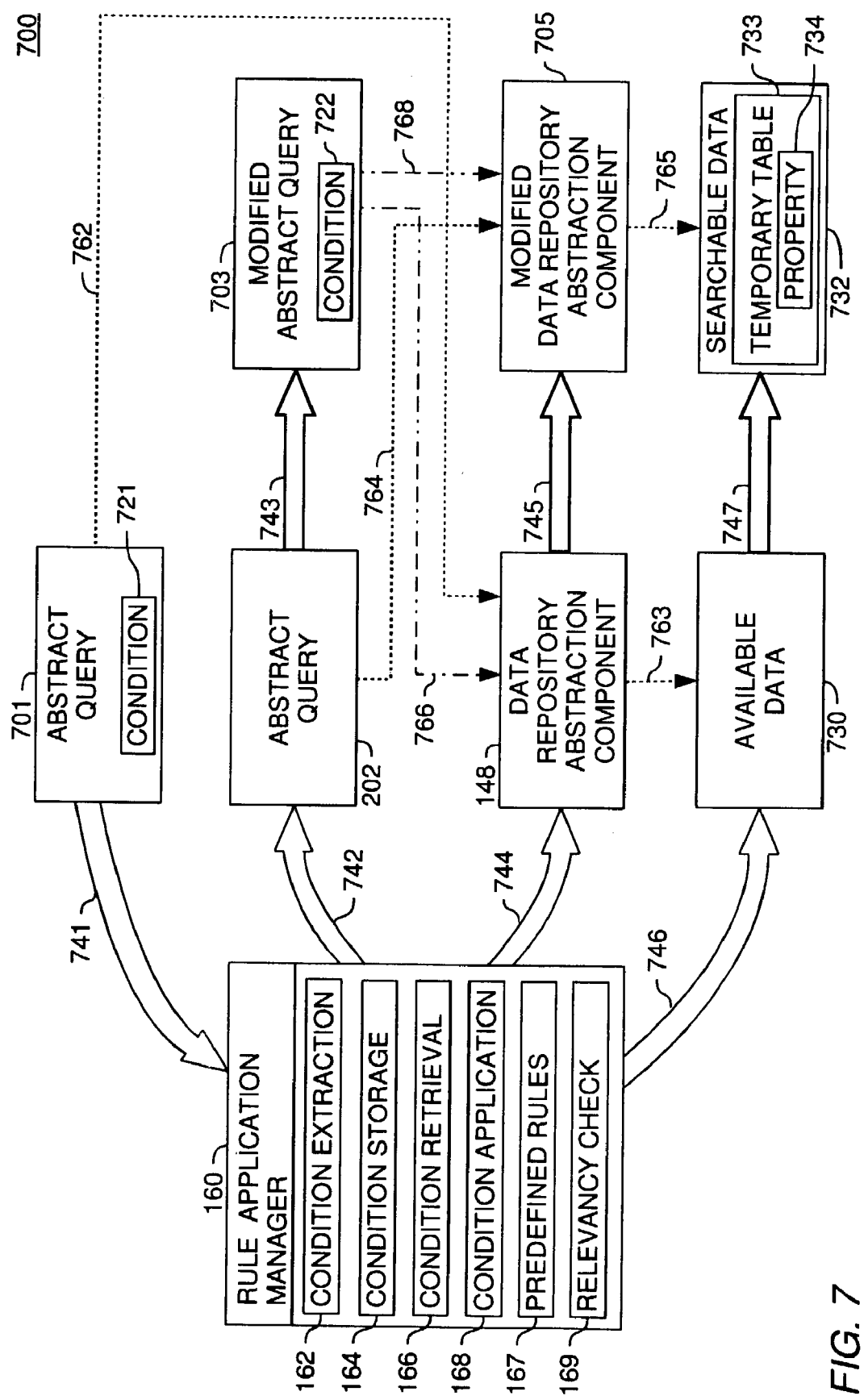
FIG. 7 is a relational view of software components of one embodiment of the invention.

Referring now to FIG. 7, a relational view of the rule application manager 160 and components of the invention is illustrated. The rule application manager 160 implements a rule application mechanism for restricting searchable data 732 (i.e., queryable data) to a subset of all available data 730 when an abstract query 701 (e.g., abstract query 202 of FIG. 2) is issued against all the available data 730. To this end, the abstract query 701 is processed by the rule application manager 160. Specifically, the rule application manager 160 performs a relevancy check, i.e., determines using relevancy determination unit 169 whether executing the abstract query 701 against the database 156 requires application of pre-defined rules 167 to the abstract query 701, data repository abstraction 148 and/or one or more physical entities of all the available data 730 in the database 156.

In one embodiment, the rule application manager 160 reads and parses the received abstract query 701 using a condition extraction unit 162 (as indicated by arrow 741) to identify and extract one or more query conditions 721 defined by the abstract query 701. The extracted conditions 721 are stored in a condition storage unit 164 (which may be, for example, cache or a portion of the storage 114 shown in FIG. 1). Using the data repository abstraction 148, the abstract query 701 is transformed into a query consistent with the underlying physical representation of all the available data 730 in the database (as indicated by dashed arrow 762). After the transformation, the abstract query 701 may be executed against all the available data 730 (as indicated by dashed arrow 763).

If another abstract query, illustratively the abstract query 202 of FIG. 2, is received, the rule application manager 160 reads and parses the abstract query 202 to identify and extract one or more query conditions from the abstract query 202, as described above. In one embodiment, the abstract query 202 is received subsequent to the abstract query 701. Using the relevancy determination unit 169, the rule application manager 160 determines whether one or more query conditions stored in the condition storage unit 164, which may have been extracted from one or more previously executed abstract queries (e.g., condition 721 of abstract query 701), are relevant to the abstract query 202. In one embodiment, identifying the relevant conditions may comprise determining conditions related to the same database table(s) and/or conditions relating to tables that are linked to the database table(s) by some identifier like a unique key (e.g., a foreign key). If the rule application manager 160 determines that at least one stored condition 722 is relevant to the abstract query 202, the rule application manager 160 retrieves the at least one stored condition using condition retrieval unit 166. Then the rule application manager 160 accesses the abstract query 202 (as indicated by arrow 742) using a condition application unit 168 to associate the at least one condition 722 with the abstract query 202 to generate (as indicated by arrow 743) a modified abstract query 703 including the at least one condition 722, as explained below with reference to FIG. 9. Using the data repository abstraction 148 the modified abstract query 703 is transformed into a query consistent with the underlying physical representation of all the available data 730 in the database (as indicated by dashed arrow 766). The modified abstract query 703 may then be executed against all the available data 730 (as indicated by dashed arrow 763).

Figure 11:
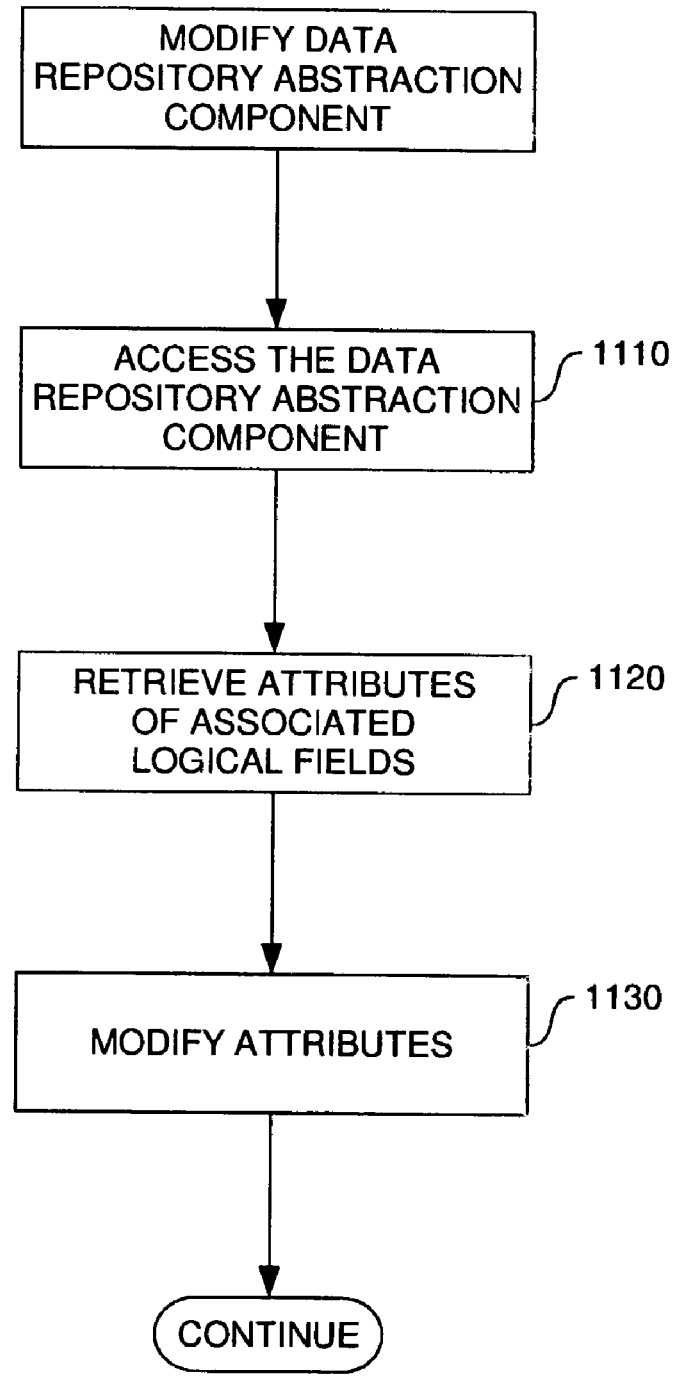
FIG. 11 is a flow chart illustrating a method of modifying a data repository abstraction component according to an embodiment of the invention.

In another embodiment, after retrieving the at least one stored condition, the rule application manager 160 may access the data repository abstraction 148 (as indicated by arrow 744) using the condition application unit 168 to modify the data repository abstraction 148 on the basis of the at least one condition, thereby generating (as indicated by arrow 745) a modified data repository abstraction 705, as explained below with reference to FIG. 11. As a result of the modification, the logical fields of the modified data repository abstraction 705 point to the physical entities of the subset of searchable data 732 in the database, rather than the entire set of all the available data 730. The abstract query 202 may then be transformed into a query consistent with the searchable data 732 (as indicated by dashed arrow 764) to be executed against the searchable data 732 (as indicated by dashed arrow 765).

In one aspect, this approach achieves improved performance at runtime since the searchable data 732 is a subset of all the available data 730. It should be noted that in this embodiment "searchable data" refers to the effectively available data since all the available data itself has not in any way been changed or restricted. Rather, the queryable data has been effectively reduced since queries are confined to what is made available by the intermediate modified data repository abstraction 705.

Figure 10:
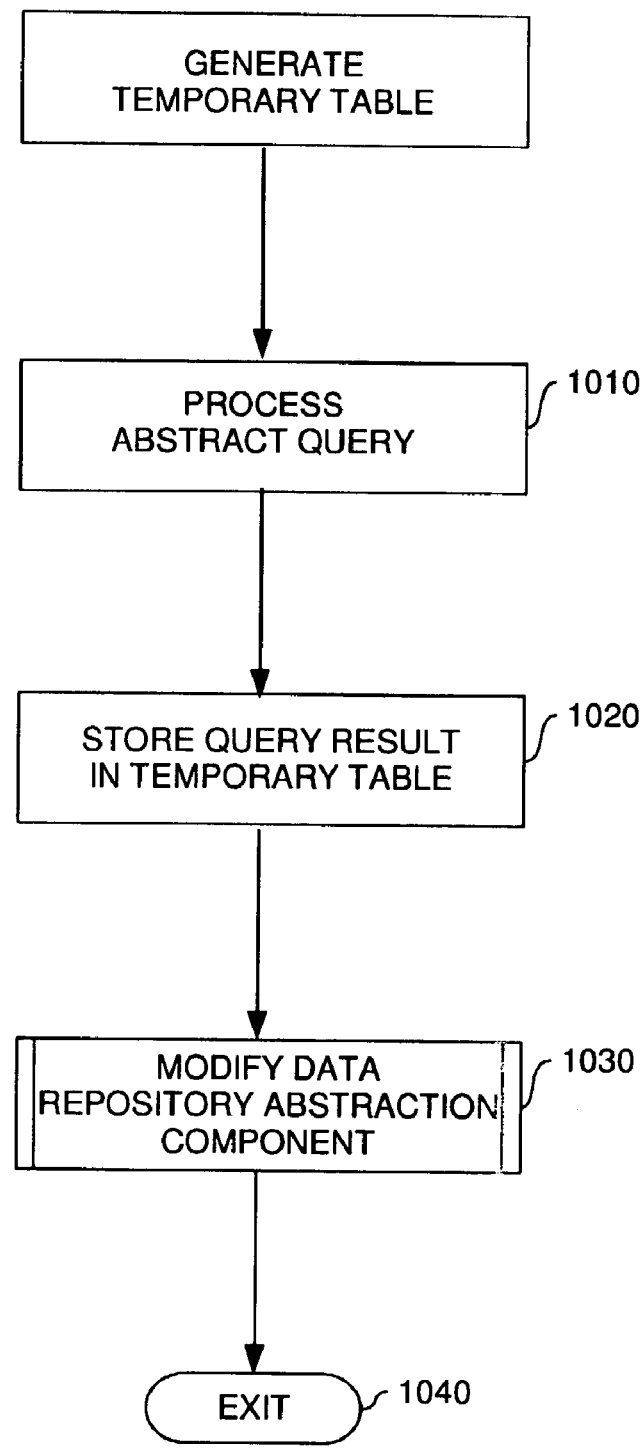
FIG. 10 is a flow chart illustrating a method of generating temporary tables according to an embodiment of the invention.

In another embodiment, all the available data 730 itself may be modified, as explained below with reference to FIG. 10. For example, after retrieving the at least one stored condition, the rule application manager 160 may determine a property 734 from the at least one condition, the property describing a characteristic of the data to be searched. For instance, assume in a medical environment a patient database table having a multiplicity of records wherein each record relates to personal data of a patient in a hospital. In the table a column "Age" may be directed towards the age of the patients and include an entry for each patient indicating the age of the corresponding patient. Accordingly, each record in the table associated with a patient of the age of "20" would have the property "age=20". Using the property, all the available data may be restricted to the searchable data 732.

The rule application manager 160 may then access all the available data 730 (as indicated by arrow 746) to modify all the available data 730 on the basis of the at least one condition using the condition application unit 168. Specifically, all the available data 730 is restricted (as indicated by arrow 747) to the searchable data 732, wherein at least a plurality of the physical entities of the searchable data 732, illustrated as temporary table 733, has the determined property 734. Additionally, the data repository abstraction 148 may be modified to the modified data repository abstraction 705 in order to point to the physical entities of the searchable data 732 in the database, thereby allowing transformation of the abstract query 202 into a query consistent with the searchable data 732.

It should be noted that the above-described relations between the components involved in FIG. 7 are merely illustrative and not construed for limiting the invention to these described relations. Instead, any possible relations between the different components are contemplated. For instance, the modified abstract query 703 may be transformed to a query consistent with the underlying physical representation using the modified data repository abstraction 705 (as indicated by dashed arrow 768). Moreover, independent of a previously received abstract query, conditions may be provided and stored in the condition storage unit 164 for restricting the searchable data 732 to a subset of all the available data 730. These stored conditions may be retrieved from the condition storage unit 164 using the condition retrieval unit 166 and associated with the abstract query 202 and/or applied to the data repository abstraction 148 and/or all the available data 730. Moreover, the properties 734 may automatically be extracted from the corresponding conditions and stored as the predefined rules 167 when processing the conditions from received abstract queries. Furthermore, the predefined rules 167 may be stored in the condition storage unit 164 together with the related conditions. Moreover, the condition application unit 168 and the relevancy determination unit 169 may be implemented as a single component performing the associated functionality.

Figure 8:
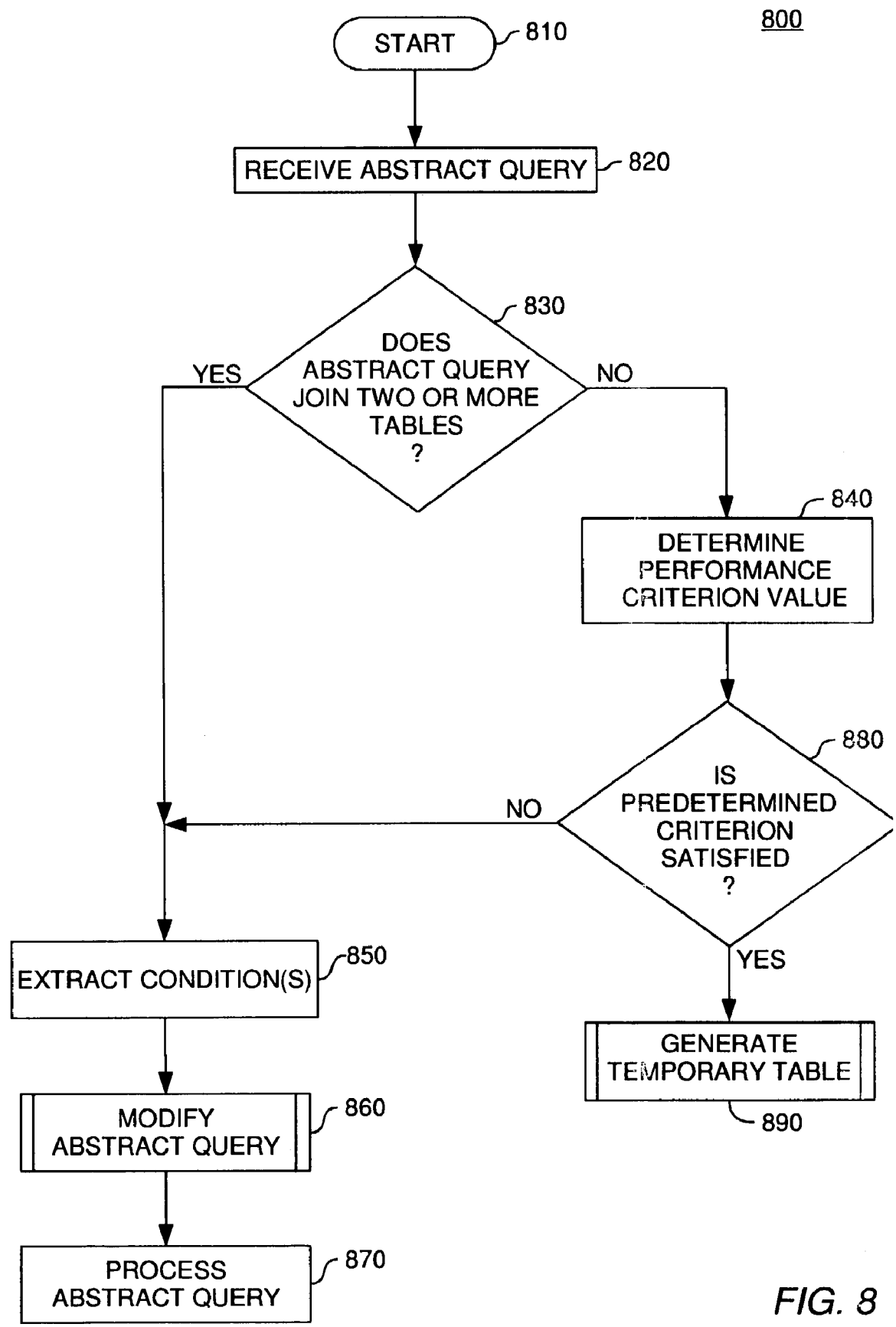
FIG. 8 is a flow chart illustrating handling of a received abstract query.

FIG. 8 is a flowchart illustrating an embodiment of a method 800 for determining whether application of predefined rules (e.g., predefined rules 167 of FIG. 7) to a received abstract query (e.g., abstract query 701 of FIG. 7 or 202 of FIG. 2), a data repository abstraction (e.g., data repository abstraction component 148 of FIG. 1) and/or one or more physical entities of all available data (e.g., available data 730 in FIG. 7) in the database 156 is required. In one embodiment, method 800 is performed by a rule application manager (e.g., rule application manager 160 of FIG. 1). By way of example only, method 800 is explained with reference to a relational database schema having a plurality of database tables which are related and may, accordingly, be joined, and wherein SQL queries are issued against the tables.

Method 800 starts at step 810. In step 820, an abstract query is received. At step 830, the rule application manager 160 determines whether the received abstract query joins two or more tables in the database. Specifically, if the received abstract query joins two or more tables, it may be assumed that generation of a single temporary table as explained below with reference to FIG. 10 (step 890) is not appropriate. This assumption is made, for instance, in view of an underlying relational database schema, wherein the two or more tables have intentionally been implemented separately for organizational purposes. Thus, generating only one single temporary table from the two or more joined tables would undermine the intended relational organization.

If it is determined that the received abstract query joins two or more tables in the database, method 800 continues at step 850 where the rule application manager 160 identifies all query conditions contained in the received abstract query. The rule application manager 160 extracts and replicates the identified query condition(s) to storage (e.g., condition storage 164 of FIG. 7) for persistently storing the replicated conditions. Thus, the stored conditions represent predefined rules that can be applied to subsequently received abstract queries if the predefined rules are relevant to corresponding subsequently received abstract queries. At step 860, the rule application manager 160 modifies the received abstract query and subsequently processes the modified abstract query at step 870 as explained above with reference to FIG. 5. One embodiment of modifying the received abstract query according to step 860 is described below with reference to FIG. 9

For example, consider that the exemplary abstract query shown in Table III below is received (for brevity, only parts that are relevant for the following explanations are shown):

TABLE III

RECEIVED ABSTRACT QUERY

| 001 | select <...> |
| 002 | from demographic, diagnosis |
| 003 | where age>18 and result=232.33 |

The received query contains a statement in line 002 indicating the queried tables "demographic" and "diagnosis" and a query condition in line 003 indicating that records having the properties "age>18" and "result=232.33" should be retrieved from these tables. Accordingly, since it is determined that the received query joins two tables, the condition "age>18 and result=232.33" is replicated to persistent storage at step 850 and the query is modified at step 860. In this example, it is noted that "232.33" is a diagnosis code, rather than a particular value for an expression.

If it is determined that the received abstract query does not join two or more tables in the database, i.e., the received abstract query is executed against a single database table, method 800 continues at step 840 where the rule application manager 160 determines a performance criterion value. In one embodiment, the performance criterion value is an estimated number of rows or records which is likely to be contained in the expected query result. Alternatively, the performance criterion value may represent a time required for execution of the abstract query until the query result is obtained. The determination of the performance criterion value may be made on the basis of a previous execution of the abstract query or using conventional database technologies. Furthermore, the rule application manager 160 determines at step 880 whether the determined performance criterion value satisfies a predetermined criterion. The predetermined criterion may, in one embodiment, be application-specific or, alternatively, be defined via user input. In one embodiment, the predetermined criterion is a maximum number of records to be returned. If the estimated number of records (from step 840) exceeds the predetermined criterion, then it may be assumed that generation of a temporary table would consume excessive system resources and, therefore, a temporary table will not be generated (i.e., processing proceeds to step 850). Otherwise, generation of a temporary table is appropriate and processing proceeds to step 890. In another embodiment, the predetermined criterion is a maximum allowable execution time. The threshold value can be determined on the basis of performance parameters of the computer system, on which query analysis is executed. An estimated performance criterion value which exceeds the predetermined criterion indicates that (re-)execution of the abstract query would be excessively time-consuming, even if generation of the temporary table would consume significant storage space. As a result, generation of a temporary table is appropriate and processing proceeds to step 890. On the other hand, an estimated performance criterion value which does not exceed the predetermined criterion may mitigate towards performing query augmentation instead, in which case processing proceeds to step 850. Whether the number of records, query execution time, or a combination of both are considered as part of method 800 is a implementation decision which may vary from one application to another.

Accordingly, if it is determined that the determined performance criteria value is not in the predetermined range of values, the method 800 continues at step 850 as described above. If it is determined that the determined performance criteria value is in the predetermined range of values, the method 800 continues at step 890, where at least one temporary table (e.g., temporary table 733 of FIG. 7) is generated and persistently stored in storage, so that the stored temporary table represents a predefined rule that can be applied to any subsequently received abstract query. One embodiment for generating a temporary table at step 890 is described below with reference to FIG. 10.

Figure 9:
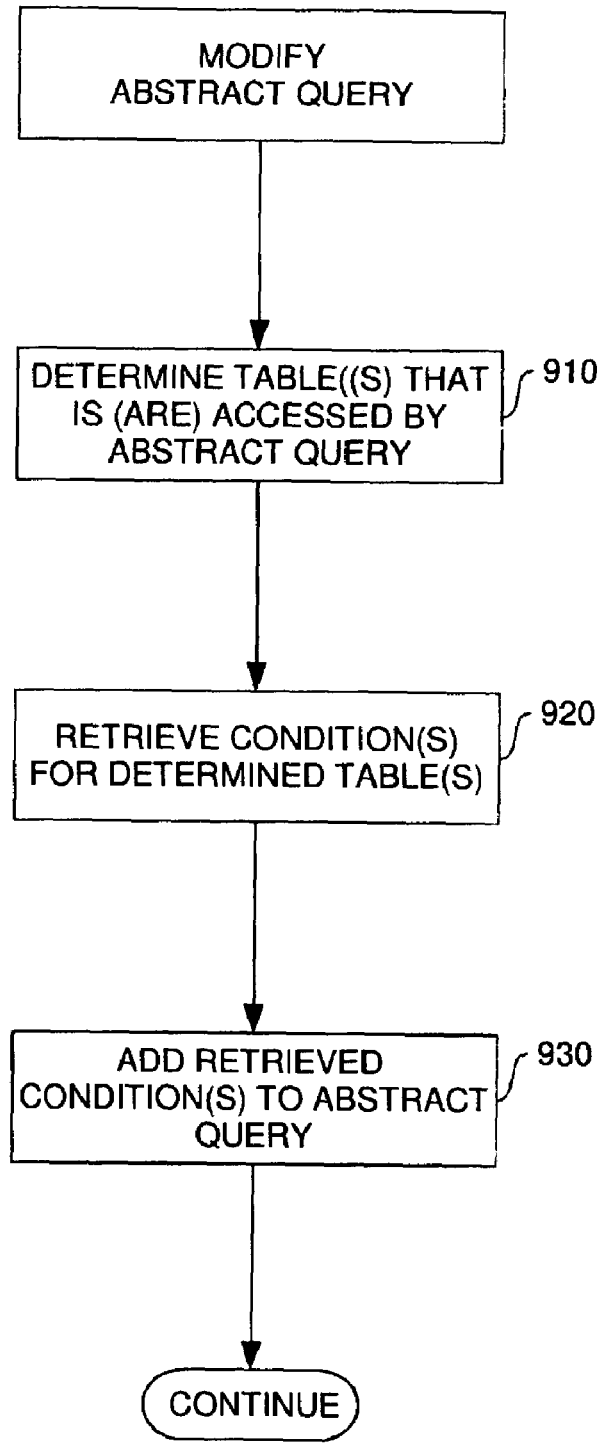
FIG. 9 is a flow chart illustrating a method of modifying an abstract query according to an embodiment of the invention.

One embodiment of a method 900 for modifying a received abstract query according to step 860 is explained with reference to FIG. 9. At step 910, the rule application manager 160 parses the received abstract query to identify the database table(s) to be queried, i.e., the table(s) that is (are) accessed by the received abstract query. At step 920, the rule application manager 160 identifies and retrieves relevant conditions from the persistent condition storage (e.g., condition storage 164 of FIG. 7) and adds the retrieved conditions to the received abstract query at step 930. Identifying the relevant conditions may comprise, for example, determining conditions related to the same database table(s) to be queried and/or conditions relating to tables that are linked to the database table(s) to be queried by some identifier like a unique key. Processing then continues as described above with respect to FIG. 8.

In the case of the received query shown in Table III, the rule application manager 160 identifies (at step 910) the tables "demographic" and "diagnosis" as those to be queried. Assume now that the exemplary abstract query shown in Table IV below was executed previous to the received query (again, for brevity, only parts that are relevant for the following explanations are shown):

TABLE IV

| PREVIOUS ABSTRACT QUERY |
| --- |
| 001 select <...> |
| 002     from demographic, test |
| 003     where (test.hemoglobin>10 and test.hemoglobin<14) and |
| 004         (demographic.city='Rochester' or |
|             demographic.city='LaCrosse') |

In the previous query the query conditions (referred to as conditions C1 and C2) shown in Table V below have been identified and replicated to persistent storage:

TABLE V

| QUERY CONDITIONS |
| --- |
| C1: (test.hemoglobin>10 and test.hemoglobin<14) |
| C2: (demographic.city='Rochester' or demographic.city='LaCrosse') |

At step 920 the rule application manager identifies condition C2 as being relevant to the received query, as condition C2 defines a rule for the table "demographic" that is also queried by the received query. Accordingly, the rule application manager adds the condition C2 to the received query to thereby generate the modified abstract query shown in Table VI below:

TABLE VI

| MODIFIED ABSTRACT QUERY |
| --- |
| 001 select <...> |
| 002     from demographic, diagnosis |
| 003     where age>18 and result=232.33 and |
| 004         (demographic.city='Rochester' or |
|             demographic.city='LaCrosse') |

One embodiment of a method 1000 for generating a temporary table (e.g., temporary table 733 of FIG. 7) according to step 890 is explained with reference to FIG. 10. At step 1010, the received abstract query is processed against one or more database tables as explained above with reference to FIG. 5 to obtain a query result. The obtained query result is persistently stored in storage (e.g., condition storage 164 of FIG. 7) as a temporary table at step 1020, the temporary table representing a rule for limiting subsequently executed abstract queries against the one or more database tables to the data contained in the temporary table. At step 1030 the corresponding data repository abstraction component (e.g., data repository abstraction component 148 of FIG. 2) is modified, as explained below with reference to FIG. 11. Then, processing exits at step 1040.

As an example, the exemplary abstract query querying a single database table named "demographic" shown in Table VII below is received (for brevity, only parts that are relevant for the following explanations are shown):

TABLE VII

| SINGLE TABLE QUERY |
| --- |
| 001 select <patient_id> |
| 002     from demographic |
| 003     where age>=20 or result>136 |

The single table query of Table VII is to be executed against the database table "demographic" shown in TABLE VIII below.

TABLE VIII

DATABASE TABLE "DEMOGRAPHIC"

| 001 | patient_id | age | result | hemo | city |
|---|---|---|---|---|---|
| 002 | 1 | 17 | 136 | 9 | Rochester |
| 003 | 2 | 17 | 136 | 9 | LaCrosse |
| 004 | 3 | 17 | 136 | 10 | Rochester |
| 005 | 4 | 18 | 136 | 10 | LaCrosse |
| 006 | 5 | 18 | 128 | 9 | Rochester |
| 007 | 6 | 18 | 128 | 9 | LaCrosse |
| 008 | 7 | 18 | 128 | 10 | Rochester |
| 009 | 8 | 19 | 152 | 10 | LaCrosse |
| 010 | 9 | 19 | 136 | 9 | Rochester |
| 011 | 10 | 19 | 136 | 9 | LaCrosse |
| 012 | 11 | 19 | 136 | 10 | Rochester |
| 013 | 12 | 19 | 136 | 10 | LaCrosse |
| 014 | 13 | 19 | 152 | 9 | Rochester |
| 015 | 14 | 19 | 152 | 9 | LaCrosse |
| 016 | 15 | 20 | 136 | 10 | Rochester |
| 017 | 16 | 20 | 152 | 10 | LaCrosse |

Assume that the performance criteria is the estimated number of records and that the threshold value is "5", so that the predetermined range of values is [0;5]. If the estimated number of records in the expected query result is "5" and, thus, does not exceed the threshold value, the single table query shown in Table VII is executed against the database table shown in Table VIII and the query result is persistently stored in storage as a temporary table shown in Table IX below:

TABLE IX

TEMPORARY TABLE

| 001 | patient_id | age | result | hemo | city |
|---|---|---|---|---|---|
| 002 | 8 | 19 | 152 | 10 | LaCrosse |
| 003 | 13 | 19 | 152 | 9 | Rochester |
| 004 | 14 | 19 | 152 | 9 | LaCrosse |
| 005 | 15 | 20 | 136 | 10 | Rochester |
| 006 | 16 | 20 | 152 | 10 | LaCrosse |

As can be seen from Table IX, only the records in lines 009 and 014–017 of Table VIII satisfy the query condition in line 003 of the single table query of Table VII and are therefore stored in the temporary table (lines 002–006). Any subsequent abstract query against the database table "demographic" shown in TABLE VIII may then be performed on the temporary table, which accordingly implements a rule for restricting the searchable data to the subset of all the available data for any subsequently received abstract query.

One embodiment of a method 1100 for modifying a data repository abstraction component (e.g., data repository abstraction component 148 of FIG. 1) according to step 1030 is explained with reference to FIG. 11. At step 1110, the rule application manager 160 accesses the data repository abstraction component and reads and parses the logical fields included therein. At step 1120, the rule application manager 160 retrieves attributes of the logical fields referring to underlying physical entities of the data in the database (e.g., database 156 of FIG. 1). At step 1130, the rule application manager 160 modifies the attributes to point to the temporary table in order to limit the data which is accessible using the data repository abstraction component to the searchable data. Processing then continues with FIG. 10 described above.

As an example, in the case of the illustrative data repository abstraction component shown in Table II above, the rule application manager 160 retrieves at step 1120 the access method attribute from line 006 (006<Simple columnName="f_name" tableName="contact"></Simple>), which refers to a database table "contact" having a column "f_name". Assuming that the temporary table has the table name "TMPcontact", the data repository abstraction will be modified to point to the "TMPcontact" table. Specifically, the access method attribute from line 006 of Table II shown above is modified to <Simple columnName="f_name" tableName="TMPcontact"></Simple>).

In various embodiments, numerous advantages over the prior art are provided. According to the invention, an easy-to-use and flexible system for writing queries that interact freely is provided. More specifically, all such queries may interact with each other or not when executed against an underlying database. For instance, if a query is run against a data warehouse and a query result is obtained, this query result may be made available to all subsequently issued queries. Accordingly, any subsequently issued query will be executed against the data warehouse as if the previous query was the definition of the data warehouse. Furthermore, combining different conditions in different orders in queries may lead to different results, which are equally useful. Executing such queries separately will also lead to valid and potentially useful query results.

Moreover, in one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case where a given physical data representation is modified or restructured, the corresponding data repository abstraction is updated to reflect changes made to the underlying physical data model. The same set of logical fields is available for use by queries, and has merely been bound to different entities or locations in a physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as UPDATE, INSERT, DELETE and the like. Of course, certain access methods may place restrictions on the type of abstract query functions that can be defined using fields that utilize that particular access method.

While the foregoing is directed to embodiments of the present invention, other and further embodiments of the invention may be devised without departing from the basic scope thereof, and the scope thereof is determined by the claims that follow.

What is claimed is:

1. A computer implemented method for restricting queryable data in a database to a subset of all available data in the database when a query is executed against the database, comprising:
providing a logical representation of all the available data defining a plurality of logical fields abstractly describing associated physical entities of all the available data, wherein each logical field is defined by a logical field name, at least one location attribute identifying a location of physical data corresponding to the logical field and a reference to an access method selected from at least two different access method types; wherein each of the different access methods types defines a different manner of exposing the physical data corresponding to the logical field, independent from the schema of the database;
providing, for a requesting entity, a query specification defining an interface to the plurality of logical fields, thereby allowing abstract queries to be composed on the basis of the plurality of logical fields;
receiving a previously executed abstract query comprising at least one logical field of the plurality of logical fields and at least one condition;
extracting the at least one condition from the previously executed abstract query and storing the at least one condition, wherein the at least one condition is used to restrict the scope of the queryable data in the database;
receiving an abstract query comprising at least one logical field of the plurality of logical fields;
retrieving the at least one condition;
associating the at least one condition with the abstract query; and
in accordance with the at least one condition, restricting the queryable data to the subset of all the available data when executing the abstract query.

2. The method of claim 1, further comprising:
providing a plurality of conditions, each condition defining at least one property of at least one physical entity of all the available data.

3. The method of claim 2, wherein retrieving the at least one condition comprises:
accessing the plurality of conditions; and
determining from the plurality of conditions the at least one condition defining the at least one property common to the plurality of physical entities of the queryable data.

4. The method of claim 2, wherein providing the plurality of conditions comprises:
receiving a plurality of previously executed abstract queries; and
for each previously executed abstract query of the plurality of previously executed abstract queries:
determining whether the previously executed abstract query comprises a condition; and
if so, extracting the condition from the previously executed abstract query.

5. The method of claim 1, wherein the executing comprises:
transforming the abstract query into a query consistent with a physical data representation of the queryable data; and
executing the query consistent with the physical data representation against the queryable data.

6. A computer implemented method for restricting queryable data in a database to a subset of all available data in the database for executing a query against the database, comprising:
providing a logical representation of all the available data defining a plurality of logical fields abstractly describing associated physical entities of all the available data, wherein each logical field is defined by a logical field name, at least one location attribute identifying a location of physical data corresponding to the logical field and a reference to an access method selected from at least two different access method types; wherein each of the different access methods types defines a different manner of exposing the physical data corresponding to the logical field, independent from the schema of the database;
providing, for a requesting entity, a query specification defining an interface to the plurality of logical fields, thereby allowing abstract queries to be composed on the basis of the plurality of logical fields;
receiving a previously executed abstract query comprising at least one logical field of the plurality of logical fields and at least one condition;
extracting the at least one condition from the previously executed abstract query and storing the at least one condition, wherein the at least one condition is used to restrict the scope of the queryable data in the database;
retrieving the at least one condition;
restricting the queryable data to the subset of all the available data using the at least one condition;
receiving an abstract query comprising at least one logical field of the plurality of logical fields; and
executing the abstract query against the queryable data.

7. The method of claim 6, wherein restricting the queryable data comprises:

determining the queryable data from all the available data using the at least one condition; and replicating the queryable data to a temporary data structure to be accessed when executing the abstract query.

8. The method of claim 7, wherein restricting the queryable data further comprises:

modifying at least a portion of the logical fields to abstractly describe associated physical entities of the temporary data structure for transforming the logical representation of all the available data into a logical representation of the temporary data structure of the queryable data.

9. The method of claim 6, wherein the database comprises at least one database table having all the available data and wherein restricting the queryable data comprises:

determining the queryable data from all the available data using the at least one condition; and replicating the queryable data to at least one temporary table to be accessed when executing the abstract query, each temporary table corresponding to a database table to which the at least one condition has been applied.

10. The method of claim 6, wherein restricting the queryable data comprises:

determining the queryable data from all the available data using the at least one condition; and modifying at least a portion of the logical fields to abstractly describe associated physical entities of the temporary data structure for transforming the logical representation of all the available data into a logical representation of the temporary data structure of the queryable data.

11. The method of claim 6, further comprising:

providing a plurality of conditions, each condition defining at least one property of at least one physical entity of all the available data.

12. The method of claim 11, wherein retrieving the at least one condition comprises:

accessing the plurality of conditions; and determining from the plurality of conditions the at least one condition defining the at least one property common to the plurality of physical entities of the queryable data.

13. The method of claim 11, wherein providing the plurality of conditions comprises:

receiving a plurality of previously executed abstract queries; and for each previously executed abstract query of the plurality of previously executed abstract queries:

determining whether the previously executed abstract query comprises a condition; and if so, extracting the condition from the previously executed abstract query.

14. The method of claim 6, wherein the executing comprises:

transforming the abstract query into a query consistent with a physical data representation of the queryable data; and executing the query consistent with the physical data representation against the queryable data.

15. A computer implemented method for restricting queryable data in a database to a subset of all available data in the database, comprising:

providing a first logical representation of all the available data defining a plurality of logical fields abstractly describing associated physical entities of all the available data, wherein each logical field is defined by a logical field name, at least one location attribute identifying a location of physical data corresponding to the logical field and a reference to an access method selected from at least two different access method types, wherein each of the different access methods types defines a different manner of exposing the physical data corresponding to the logical field, independent from the schema of the database;

providing, for a requesting entity, a query specification defining an interface to the plurality of logical fields, thereby allowing abstract queries to be composed on the basis of the plurality of logical fields;

receiving a first abstract query comprising at least one logical field of the plurality of logical fields and at least one condition;

extracting the at least one condition from the first abstract query; and storing the at least one condition, wherein the condition defines at least one property common to a plurality of physical entities of the queryable data;

retrieving the at least one condition; and modifying at least a portion of the logical fields to abstractly describe the plurality of physical entities of the queryable data for providing, using the at least one condition, a second logical representation of the queryable data from the first logical representation.

16. The method of claim 15, wherein modifying at least a portion of the logical fields comprises:

generating an instance of the first logical representation; and modifying at least a portion of the logical fields of the instance for transforming the instance into the second logical representation.

17. The method of claim 15, further comprising:

receiving a second abstract query comprising at least one logical field of the plurality of logical fields; and executing the second abstract query against the queryable data.

18. The method of claim 15, further comprising:

providing a plurality of conditions, each condition defining at least one property of at least one physical entity of all the available data.

19. The method of claim 18, wherein retrieving the at least one condition comprises:

accessing the plurality of conditions; and determining from the plurality of conditions the at least one condition defining the at least one property common to the plurality of physical entities of the queryable data.

20. The method of claim 18, wherein providing the plurality of conditions comprises:

receiving a plurality of abstract queries; and for each abstract query of the plurality of abstract queries:

determining whether the abstract query comprises a condition; and if so, extracting the condition from the abstract query.

21. The method of claim 15, further comprising:

receiving a second abstract query comprising at least one logical field of the plurality of logical fields;

transforming the second abstract query into a query consistent with a physical data representation of the queryable data; and executing the query consistent with the physical data representation against the queryable data.

22. A tangible computer-readable storage medium containing a program which, when executed by a processor, performs an operation for restricting queryable data in a database to a subset of all available data in the database when a query is executed against the database, the operation comprising:

extracting at least one condition from a previously executed abstract query; and storing the at least one condition;

in response to receiving an abstract query, wherein the abstract query comprises at least one logical field selected from a plurality of logical fields, and wherein each logical field is defined by a logical field name, at least one location attribute identifying a location of physical data corresponding to the logical field and a reference to an access method; wherein the access method defines a manner of exposing the physical data corresponding to the logical field, independent from the schema of the database:

retrieving the at least one condition, wherein the at least one condition is used to restrict the scope of the queryable data in the database;

associating the at least one condition with the abstract query; and in accordance with the at least one condition, restricting the queryable data to the subset of all the available data when executing the abstract query.

23. The tangible computer-readable storage medium of claim 22, wherein the operation further comprises:

storing a plurality of conditions, wherein each condition is used to restrict the scope of the queryable data in the database.

24. The tangible computer-readable storage medium of claim 23, wherein retrieving the at least one condition comprises:

accessing the stored plurality of conditions; and determining from the stored plurality of conditions the at least one condition defining the at least one property common to the plurality of physical entities of the queryable data.

25. The tangible computer-readable storage medium of claim 23, wherein storing the plurality of conditions comprises:

in response to receiving a plurality of previously executed abstract queries:

for each previously executed abstract query of the plurality of previously executed abstract queries:

determining whether the previously executed abstract query comprises a condition; and if so, extracting the condition from the previously executed abstract query.

26. The tangible computer-readable storage medium of claim 22, wherein the executing comprises:

transforming the abstract query into a query consistent with a physical data representation of the queryable data; and executing the query consistent with the physical data representation against the queryable data.

27. A tangible computer-readable storage medium containing a program which, when executed by a processor, performs an operation for restricting queryable data in a database to a subset of all available data in the database for executing a query against the database, the operation comprising:

receiving a first abstract query that includes at least one condition, extracting and storing the at least one condition from the first abstract query;

in response to receiving a second abstract query comprising at least one logical field of a plurality of logical fields defined in a logical representation of all the available data, wherein the plurality of logical fields abstractly describe associated physical entities of all the available data:

retrieving the at least one condition, wherein the at least one condition defines at least one property common to a plurality of physical entities of the queryable data;

restricting the queryable data to the subset of all the available data using the at least one condition; and executing the second abstract query against the queryable data.

28. The tangible computer-readable storage medium of claim 27, wherein restricting the queryable data comprises:

determining the queryable data from all the available data using the at least one condition; and replicating the queryable data to a temporary data structure to be accessed when executing the second abstract query.

29. The tangible computer-readable storage medium of claim 28, wherein restricting the queryable data further comprises:

modifying at least a portion of the logical fields to abstractly describe associated physical entities of the temporary data structure for transforming the logical representation of all the available data into a logical representation of the temporary data structure of the queryable data.

30. The tangible computer-readable storage medium of claim 27, wherein the database comprises at least one database table having all the available data and wherein restricting the queryable data comprises:

determining the queryable data from all the available data using the at least one condition; and replicating the queryable data to at least one temporary table to be accessed when executing the second abstract query, each temporary table corresponding to a database table to which the at least one condition has been applied.

31. The tangible computer-readable storage medium of claim 27, wherein restricting the queryable data comprises:

determining the queryable data from all the available data using the at least one condition; and modifying at least a portion of the logical fields to abstractly describe associated physical entities of the temporary data structure for transforming the logical representation of all the available data into a logical representation of the temporary data structure of the queryable data.

32. The tangible computer-readable storage medium of claim 27, further comprising:

storing a plurality of conditions, each condition defining at least one property of at least one physical entity of all the available data.

33. The tangible computer-readable storage medium of claim 32, wherein retrieving the at east one condition comprises:

accessing the stored plurality of conditions; and determining from the stored plurality of conditions the at least one condition defining the at least one property common to the plurality of physical entities of the queryable data.

34. The tangible computer-readable storage medium of claim 32, wherein storing the plurality of conditions comprises:

in response to receiving a plurality of previously executed abstract queries:
  for each previously executed abstract query of the plurality of previously executed abstract queries:
    determining whether the previously executed abstract query comprises a condition; and
    if so, extracting the condition from the previously executed abstract query.

35. The tangible computer-readable storage medium of claim 27, wherein the executing comprises:
  transforming the second abstract query into a query consistent with a physical data representation of the queryable data; and
  executing the query consistent with the physical data representation against the queryable data.

36. A tangible computer-readable storage medium containing a program which, when executed by a processor, performs an operation for restricting queryable data in a database to a subset of all available data in the database, the operation comprising:
  in response to user input, generating a first logical representation of all the available data defining a plurality of logical fields abstractly describing associated physical entities of all the available data, wherein each logical field is defined by a logical field name, at least one location attribute identifying a location of physical data corresponding to the logical field and a reference to an access method; wherein the access method defines a manner of exposing the physical data corresponding to the logical field, independent from the schema of the database;
  providing, for a requesting entity, a query specification defining an interface to the plurality of logical fields, thereby allowing abstract queries to be composed on the basis of the plurality of logical fields;
  in response to receiving a first abstract query comprising at least one logical field of the plurality of logical fields and at least one condition;
  extracting and storing the at least one condition from the first abstract query;
  retrieving the at least one condition that was included in the first abstract query, wherein the at least one condition is used to restrict the scope of the queryable data to data in the database that is consistent with the at least one condition; and
  modifying at least a portion of the logical fields to abstractly describe the plurality of physical entities of the queryable data, using the at least one condition, to generate a second logical representation of the queryable data from the first logical representation.

37. The tangible computer-readable storage medium of claim 36, wherein modifying at least the portion of the logical fields comprises:
  generating an instance of the first logical representation; and
  modifying at least the portion of the logical fields of the instance for transforming the instance into the second logical representation.

38. The tangible computer-readable storage medium of claim 36, wherein the operation further comprises:
  in response to receiving an abstract query comprising at least one logical field of the plurality of logical fields:
    executing the abstract query against the queryable data.

39. The tangible computer-readable storage medium of claim 36, wherein the operation further comprises:
  storing a plurality of conditions included in the first abstract query.

40. The tangible computer-readable storage medium of claim 39, wherein retrieving the at least one condition comprises:
  accessing the stored plurality of conditions; and
  determining from the stored plurality of conditions the at least one condition defining the at least one property common to the plurality of physical entities of the queryable data.

41. The tangible computer-readable storage medium of claim 39, wherein storing the plurality of conditions comprises:
  receiving a plurality of abstract queries; and
  for each abstract query of the plurality of abstract queries:
    determining whether the abstract query comprises a condition; and
    if so, extracting the condition from the abstract query.

42. The tangible computer-readable storage medium of claim 36, wherein the operation further comprises:
  in response to receiving an abstract query comprising at least one logical field of the plurality of logical fields;
    transforming the abstract query into a query consistent with a physical data representation of the queryable data; and
    executing the query consistent with the physical data representation against the queryable data.

* * * * *